Figure 1:
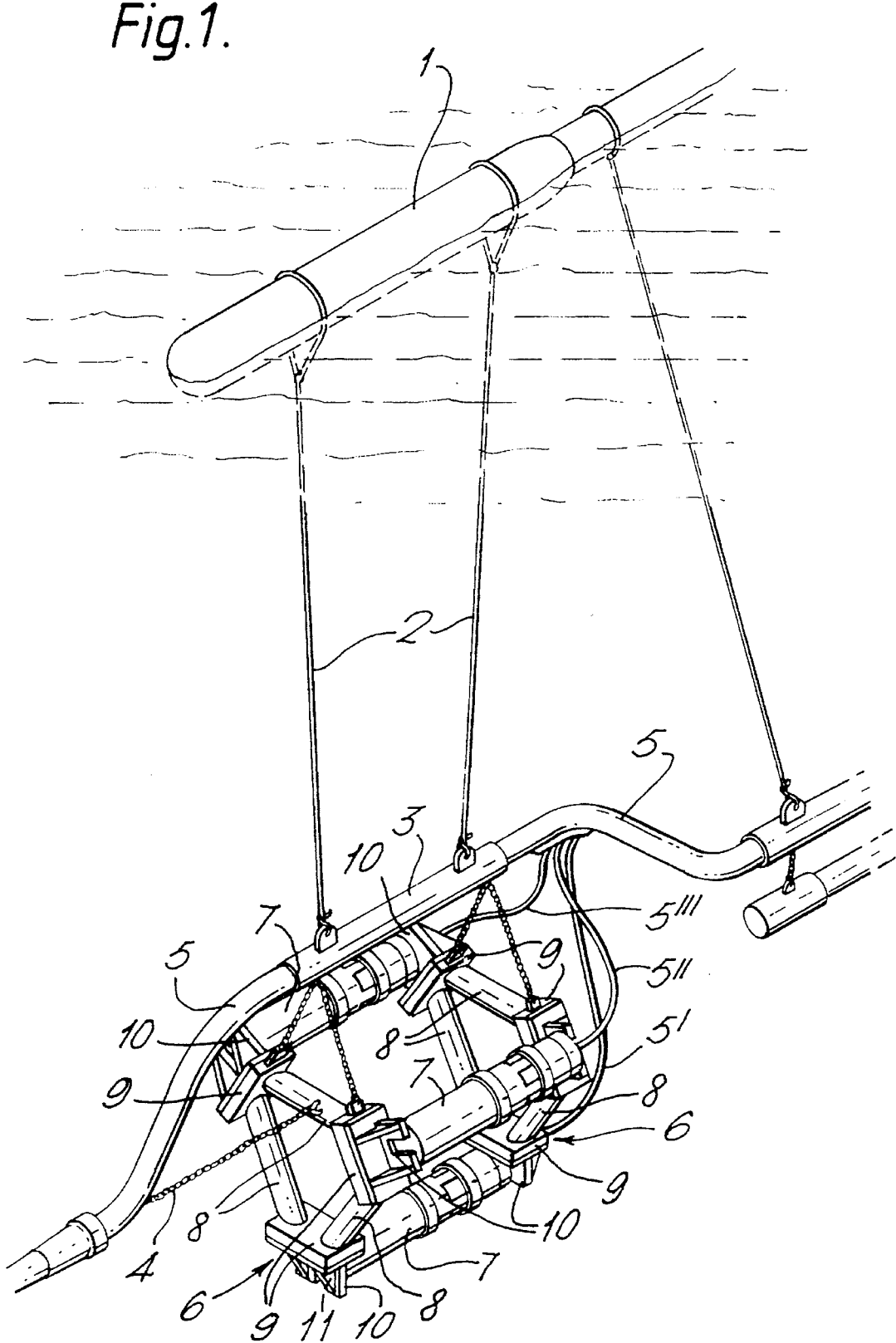

United States Patent [19]
Cappelen et al.

[11] Patent Number: 5,475,188
[45] Date of Patent: Dec. 12, 1995

[54] DEVICE FOR SECURING TWO OR MORE SEISMIC ENERGY SOURCES AT FIXED RELATIVE POSITIONS

[75] Inventors: Hans Cappelen, Lierskogen; Tor Elholm, Hosle; Odd O. Vatne, Oslo; Åyvind Sårbotten, Haugesund, all of Norway

[73] Assignee: Geco A.S., Stavanger, Norway

[21] Appl. No.: 204,184

[22] PCT Filed: Sep. 1, 1992

[86] PCT No.: PCT/NO92/00137

§ 371 Date: Mar. 4, 1994

§ 102(e) Date: Mar. 4, 1994

[87] PCT Pub. No.: WO93/05410

PCT Pub. Date: Mar. 18, 1993

[30] Foreign Application Priority Data

Sep. 4, 1991 [NO] Norway .................................. 913482

[51] Int. Cl.⁶ ............................................... G01V 1/04
[52] U.S. Cl. ........................................... 181/120; 367/144
[58] Field of Search .............................. 367/144; 181/120

[56] References Cited

U.S. PATENT DOCUMENTS

| | | | |
|---|---|---|---|
| 4,721,180 | 1/1988 | Haughland et al. | 367/153 |
| 4,858,205 | 8/1989 | Harrison | 367/153 |
| 4,970,046 | 11/1990 | Dolengowski | 367/153 |
| 5,051,966 | 9/1991 | Gjestrum et al. | 367/153 |

FOREIGN PATENT DOCUMENTS 0368472  5/1990  European Pat. Off. .

*Primary Examiner*—J. Woodrow Eldred
*Attorney, Agent, or Firm*—Jacobson, Price, Holman & Stern

[57] ABSTRACT

A device for securing two or more seismic energy sources at fixed relative positions during firing of the sources consists of a rigid framework comprising end frames and intermediate bars. In order to provide an extremely light but at the same time completely rigid framework, the seismic energy sources are used as longitudinal bars between the end elements.

11 Claims, 3 Drawing Sheets

DEVICE FOR SECURING TWO OR MORE SEISMIC ENERGY SOURCES AT FIXED RELATIVE POSITIONS

The invention concerns a device for securing two or more seismic energy sources at fixed relative positions during firing of the sources, by placing them in a rigid framework consisting of end frames and intermediate longitudinal bars. The seismic energy sources are preferably of the airgun type.

In seismic surveys at sea the seismic signals are transmitted from energy sources which are normally arranged in groups. In order to increase the effect from energy sources these may also be arranged in sets, with several seismic energy sources or airguns being suspended in a frame-like arrangement, a so-called "cluster".

In an article in the periodical Geophysics, Vol. 44, no. 5 (May 1979), pages 865–879, there is a description of an arrangement of airguns in a group or "cluster" where the guns are secured in the frame at predetermined intervals, thus enabling them to be fired while in a state of constant geometry and without this geometry being altered by or after the firing. Such an assembly of airguns in a framework offers a number of advantages when conducting seismic surveys, but is a technique which has been known for some time and which does not constitute any part of the present invention.

In U.S. Pat. No. 4,719,987 (corresponding to Norwegian patent application no. 85 2459) an embodiment is illustrated for suspension of seismic energy sources in groups, where the energy sources are kept at fixed relative positions by means of a chain device which is attached to the sources by means of sleeves. However, during firing these energy sources will be able to move in relation to one another and it will not be possible to obtain 100% accurate positioning.

Furthermore, in NO patent no. 165 857 there is a description of a securing device for seismic energy sources in a framework, where the energy sources or airguns are fastened in a frame and secured in a shock-absorbing rubber packing. Although it is true that in this construction the airguns are secured at defined intervals, the device requires a relatively large amount of space and every frame is constructed for a special gun type, or the securing device has to be adpated to suit the respective gun types.

The object of the present invention is to provide a new device for securing two or more seismic energy sources at relative positions during firing of the source, which device, while forming a completely rigid framework for the seismic energy sources, should at the same time be as simple as possible, so that it is easy to stow away when not in use and also easy to assemble. A further object of the invention is to provide a rigid framework of a type which does not cause any bouncing or shifting of the guns in relation to one another, and which can be used for guns of different sizes so that it is only necessary to keep one single type of device in store.

In U.S. Pat. No. 4,970,046 it is also described a system for positioning of airguns. According to this U.S. patent the air guns are held in position and spaced from each other by means of single rod elements comprising shock absorbers, connecting means and clamps. The frame according to the U.S. patent is in reality a system in which a plurality of rod elements are provided between air guns in order to maintain the space between them. The system is time consuming in building up an air gun configuration and the rod elements will also have a certain influence on the pulses from the air guns.

Further examples on frames and fastening means for connecting air guns are shown in the U.S. Pat. Nos. 4,721, 180, 4,858,205 and the European Patent Application 0368472.

Yet another object of the invention is to supply a device which is designed in such a way that the frame does not obstruct the positioning of the guns in any way, so that the transmitted sound pulses are in no way affected by the framework.

These objects are achieved by a device of the type described in the introduction, which is characterized by the features in the claims presented.

In the design of the frame in accordance with the invention all the above-mentioned advantages are achieved. The most advantageous embodiment of the invention is as a triangular frame for assembling three single airguns to form a high energy source. The character of a small gun or energy source will be retained, while the energy level is increased. The signal properties will be extremely sensitive to the distance between the guns, and this distance will be accurately maintained by means of the construction according to the invention, since the guns are secured in fixed positions. Powerful forces are generated by the firing of the energy sources. The frame will suffer the effects both of the impact from the source during the firing as well as the explosion which is triggered and the collapse of the air bubble which is formed by the released high pressure air. The forces from the guns and the bubbles have been calculated and the frame is designed to take account of these forces. Enormous impact forces would also have been expended upon every element placed in the central area of the frame or cluster. In the invention this central area is free of any construction elements. During the firing the seismic sources, i.e. the airguns, will be exposed to radial forces, which will be dispersed to the other guns via the end frames. These end frames will mainly be exposed to axial forces. Since the end frames are placed at a distance from those pressure waves which are formed during the firing, they will be exposed to minimal force effects. From the point of view of the forces involved, therefore, the open construction in accordance with the invention is extremely favourable while at the same time providing a rigid arrangement of the guns in the cluster. There will also be the additional advantage that the same end frameworks can be used for different gun sizes.

Figure 2:
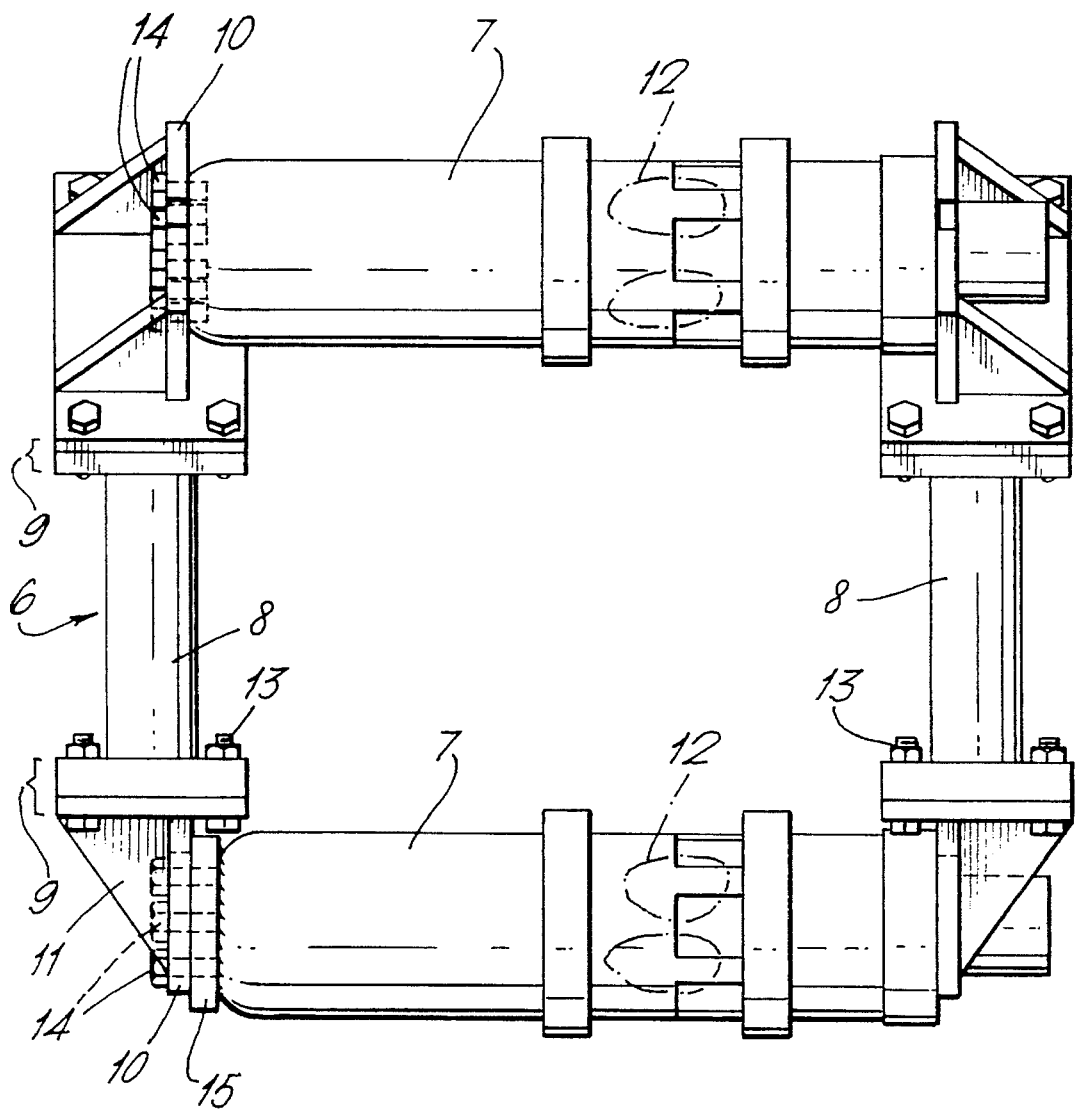
Figure 3:
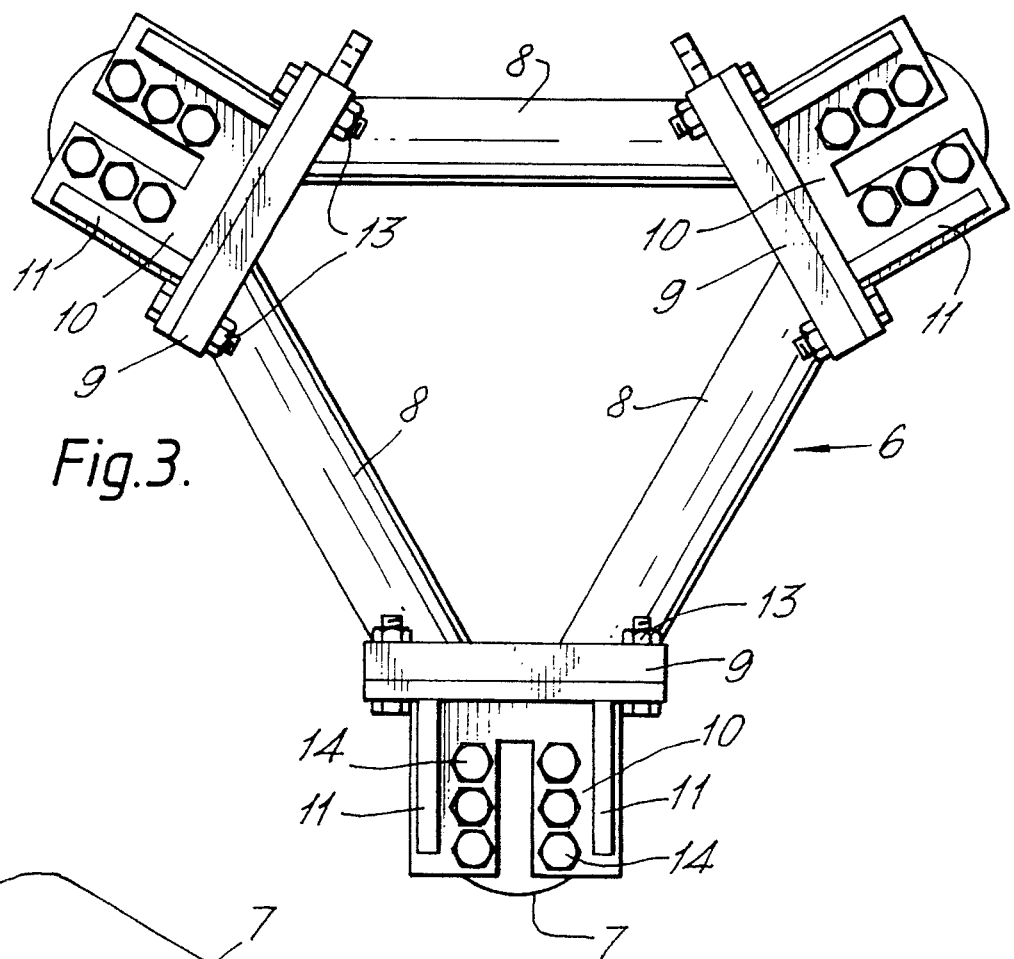
Figure 4:
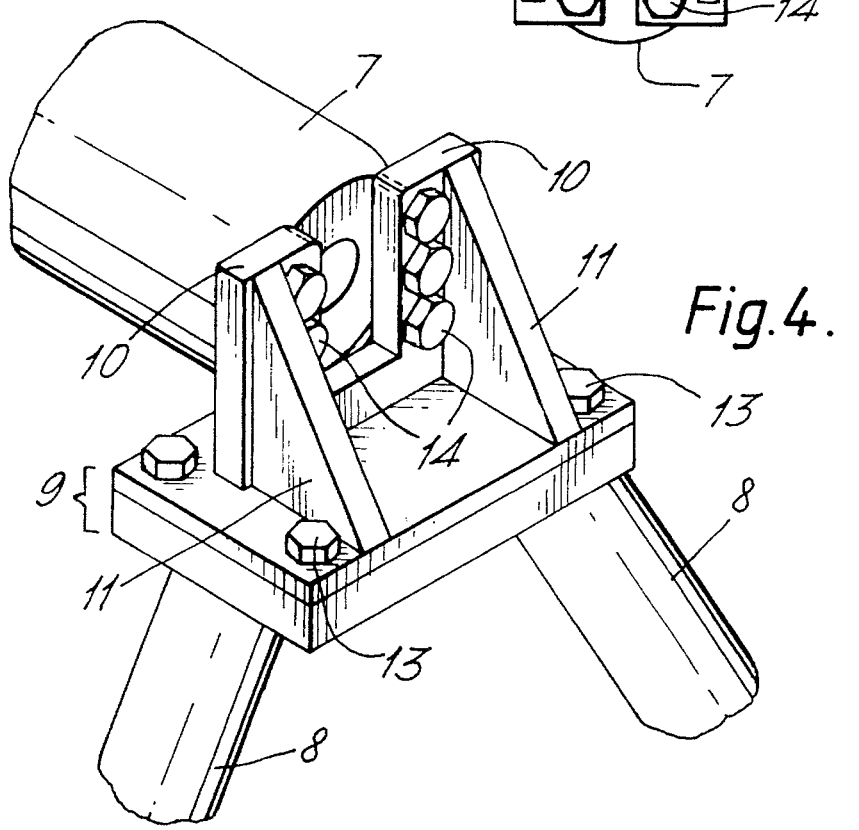

In the following section the invention will be explained in more detail by means of an embodiment which is illustrated in purely schematic form in the drawings:

FIG. 1 is a schematic perspective view illustrating the principle for construction of a device in accordance with the invention for use in seismic surveys, FIG. 2 is a side view of the device according to the invention, as it is also illustrated in purely schematic form in FIG. 1, FIG. 3 is a schematic view of an end frame of the type which is illustrated in FIG. 2, and FIG. 4 is a perspective view illustrating a corner connection of an end frame.

In a marine seismic survey a number of seismic energy sources or airguns are arranged in the normal manner in an array towed in a predetermined pattern or sequence behind a seismic vessel. In those seismic areas it can be expedient to arrange guns in groups or clusters. The guns are suspended in the usual way in a float 1 on the surface of the water, from which float lines lead down to a securing bracket 3 which again holds the airgun arrangement. This well-known principle is illustrated in FIG. 1 and the drawing shows in particular a cluster device in accordance with the invention of three such guns 7. The device in accordance with the invention is suspended in a special way in the bracket 3 and is supplied with its control pulses together with compressed air through the air hose 5 with side hoses 5', 5" and 5''', which lead to the respective three guns. In the illustrated embodiment the guns are arranged in a triangular configuration, in which the two uppermost guns 7 are positioned horizontally on the same level, while the third deeper lying gun forms the third side of the configuration. The guns 7 are secured in position in relation to one another by means of two end frames which are generally indicated by 6. The end frames can, as in the example shown, consist of pipe elements 8 whose end sections are welded on to plate elements 9, thus forming a triangle with blunt end pieces. These end plates 9 are preferably arranged at right angles to the opposite side 8 of the triangle. The sides or pipe elements 8 are preferably formed from cylindrical pipes, but other configurations will also be entirely feasible.

The end plates 9 are joined to an additional plate 10 positioned at right angles to the plate 9 to form the attachment element for the longitudinal steps between two end frames 6 which are formed by the airguns 7. For stiffening purposes, the angular attachment element thus created can be reinforced with stiffening parts 11. The attachment plate 10 is equipped with attachment elements for the airguns 7. In the simplest and most practical embodiment these attachment elements consist quite simply of through-going bolts which can be screwed into holes tapped for this purpose at both ends of the guns 7. Thus an extremely simple method of assembling the cluster construction can be achieved.

Normally the end portions of the guns 7 are rounded. To compensate for this, plates which e.g., can be welded on can also be attached to the ends of the guns, and these plates can then be screwed on to the plates 10 to form a completely rigid and permanent connection. This embodiment is clearly illustrated in FIG. 2 which also shows the securing screws or bolts 14. In this embodiment the plate element 9 also consists of two plate parts, thus providing a connection between the pipe elements 8 and the attachment fittings 9, 10, 11 which can be disconnected, i.e. also replaced. This embodiment is also clearly illustrated in the perspective view in FIG. 4. FIG. 2 also illustrates the point for transmission of the seismic pulses or air bubbles, this area being indicated by 12.

FIG. 3 illustrates the simple, triangular construction of the end frames 6. It should be noted that other constructions can, of course, be used here, such as a more pointed frame or a construction with four guns, even though the preferred embodiment is a frame in the form of an isosceles triangle. Theoretically it should also be possible to mount the attaching places at points other than the corners.

FIG. 4 illustrates an advantageous embodiment of the attachment fitting, where the plate 10 is in two parts, thus providing access to not shown connections for compressed air and the control hoses 5'-5'''.

One of the major advantages of the device according to the invention is that, when it is not in use and, e.g., has to be stored on board a seismic vessel, the cluster can be very easily dismantled by simply unscrewing the airguns and placing the two end frames alongside each other. The construction will thus also be considerably easier to handle and will also be light in weight. For example, an end frame construction according to the invention will weight around 90 kg, while the previously used cluster frames of fixed construction for a similar gun configuration could weigh around 5–600 kg (without guns).

This weight saving also means that a cluster according to the invention will be considerably lighter to tow behind a ship, since the float construction can also be made lighter, the weight having been reduced.

As already mentioned, many modifications of the device according to the invention will be possible. No special mention has been made in the above, e.g., of the attachment of tow wires, which are indicated by 4 in FIG. 1, since this will be a feature which the skilled person himself will be able to choose. The figure illustrates that the device according to the invention is suspended in the bracket 3, from the securing devices in the corners of the end frame, but it is, of course, also possible to use the attachment lugs already supplied on normal airguns and designed for the suspension of the guns in a similar way, when they are used individually. It will be possible to alter both the form of the device and the construction of the method of attachment within the scope of the invention.

We claim:

1. A device for securing at least two seismic energy sources at a fixed relative position, characterized in that said at least two seismic energy sources comprise longitudinal bars which are mounted between stiff frame constructions so that the stiff frame constructions and said at least two seismic energy sources in common are providing a stiff system.

2. The device according to claim 1, characterized in that the frame constructions are mounted at opposite longitudinal ends of said at least two seismic energy sources so that a firing center of each of said at least two seismic energy sources is located far from said frame constructions.

3. The device according to claim 1, characterized in that each of said frame constructions comprises rigidly interconnected frame elements positioned in one plane and attachment devices for connecting the frame constructions to opposite longitudinal ends of said at least two seismic energy sources.

4. The device according to claim 1, characterized in that the frame constructions are in the form of a triangle and particularly in the form of an isosceles triangle.

5. The device according to claim 1, characterized in that said frame constructions include attachment devices which consist of screwbolt connections, each of said screwbolt connections being arranged so as to receive bolts which are screwed into tapped holes in opposite longitudinal ends of said at least two seismic energy sources.

6. The device according to claim 1, characterized in that each of said frame constructions comprises rigidly interconnected frame elements positioned in one plane, said frame elements being interconnected by welded plates which are disposed at corners of the frame constructions, each of said welded plates having flange plates mounted thereon and one plate part arranged perpendicular to the longitudinal bars.

7. The device according to claim 1, characterized in that said at least two seismic energy sources include mounting plates disposed at opposite longitudinal ends of each of said at least two seismic energy sources, each of said mounting plates having holes for receiving attaching bolts.

8. The device according to claim 1, characterized in that said device is suspended by said frame constructions and that said device includes energy supply and control cables for said at least two seismic energy sources, said energy supply and control cables being inserted into said at least two seismic devices via a plurality of attaching devices disposed on each of said frame constructions.

9. The device according to claim 1, characterized in that said device is suspended by suspension fittings disposed on said at least two seismic energy sources.

10. The device according to claim 1, characterized in that said device has a triangular configuration and is suspended such that an apex of said triangular configuration points downwardly in a direction of gravitational force.

11. The device according to claim 1, characterized in that each of said frame constructions comprises rigidly interconnected frame elements positioned in one plane, said frame elements being round in cross section.

* * * * *

UNITED STATES PATENT AND TRADEMARK OFFICE
CERTIFICATE OF CORRECTION

PATENT NO. : 5,475,188
DATED : December 12, 1995
INVENTOR(S) : CAPPELEN et al

It is certified that error appears in the above-identified patent and that said Letters Patent is hereby corrected as shown below:

Title page, item [75], change the spelling of the fourth inventor's name from "Åyvind Sårbotten" to --Øyvind Sørbotten--.

Signed and Sealed this

Twenty-sixth Day of November 1996

Attest:

BRUCE LEHMAN

Attesting Officer

Commissioner of Patents and Trademarks